United States Patent
Mitchell et al.

(10) Patent No.: US 12,084,561 B2
(45) Date of Patent: Sep. 10, 2024

(54) CURABLE FLUOROPOLYMER COMPOSITIONS COMPRISING BIS PHTHALONITRILE-CONTAINING COMPOUND AND CURED ARTICLES THEREFROM

(71) Applicant: 3M INNOVATIVE PROPERTIES COMPANY, St. Paul, MN (US)

(72) Inventors: Michael H. Mitchell, Edina, MN (US); Benjamin J. Anderson, Eden Prairie, MN (US); Gregg D. Dahlke, St. Paul, MN (US); Tatsuo Fukushi, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 639 days.

(21) Appl. No.: 17/296,564

(22) PCT Filed: Dec. 4, 2019

(86) PCT No.: PCT/IB2019/060435
§ 371 (c)(1),
(2) Date: May 25, 2021

(87) PCT Pub. No.: WO2020/121125
PCT Pub. Date: Jun. 18, 2020

(65) Prior Publication Data
US 2022/0025154 A1  Jan. 27, 2022

Related U.S. Application Data

(60) Provisional application No. 62/779,583, filed on Dec. 14, 2018.

(51) Int. Cl.
| | | |
|---|---|---|
| *C08K 5/315* | (2006.01) | |
| *C08F 214/18* | (2006.01) | |
| *C08F 214/22* | (2006.01) | |
| *C08F 214/28* | (2006.01) | |
| *C08J 5/18* | (2006.01) | |
| *C09K 3/10* | (2006.01) | |

(52) U.S. Cl.
CPC .......... *C08K 5/315* (2013.01); *C08F 214/184* (2013.01); *C08F 214/22* (2013.01); *C08F 214/28* (2013.01); *C08J 5/18* (2013.01); *C09K 3/1009* (2013.01); *C08F 2800/20* (2013.01); *C08J 2327/16* (2013.01); *C08J 2327/20* (2013.01); *C09K 2200/0637* (2013.01)

(58) Field of Classification Search
CPC .................. C09K 5/315; C09K 3/1009; C09K 2200/0637; C08F 214/184; C08F 214/22; C08F 214/28; C08L 5/18; C08L 2327/16; C08L 2327/20
USPC ...................................................... 524/208
See application file for complete search history.

(56) References Cited

U.S. PATENT DOCUMENTS

| | | |
|---|---|---|
| 3,876,654 A | 4/1975 | Pattison |
| 4,233,421 A | 11/1980 | Worm |
| 5,225,504 A | 7/1993 | Tatsu |
| 6,191,233 B1 | 2/2001 | Kishine |
| 8,138,271 B2 | 3/2012 | Washino |
| 2011/0152487 A1 | 6/2011 | Cook |
| 2017/0066877 A1 | 3/2017 | Hintzer et al. |
| 2018/0155276 A1 | 6/2018 | Kim |
| 2018/0313405 A1 | 11/2018 | Richard et al. |

FOREIGN PATENT DOCUMENTS

| | | |
|---|---|---|
| CN | 101143928 A | 3/2008 |
| CN | 106700419 A | 5/2017 |
| WO | WO2017-013379 | 1/2017 |
| WO | WO2018-136324 | 7/2018 |
| WO | WO2018-136331 | 7/2018 |
| WO | WO2018-136332 | 7/2018 |

OTHER PUBLICATIONS

International Search Report for PCT International Application No. PCT/IB2019/060435, mailed on Jul. 14, 2015, 5 pages.

*Primary Examiner* — Ruiyun Zhang
(74) *Attorney, Agent, or Firm* — Julie Lapos-Kuchar

(57) ABSTRACT

Described herein are fluoropolymer compositions comprising a bis phthalonitrile-containing compound. In one embodiment, the bis phthalonitrile-containing compound is used to crosslink a dehydrohalogenated polymer, and optionally with a polyhydroxy curative. In another embodiment, the bis phthalonitrile-containing compound is added to a composition comprising (i) a fluorinated elastomeric gum, wherein the fluorinated elastomeric gum comprises a fluoropolymer having a cure-site and (ii) a peroxide curing system.

16 Claims, No Drawings

CURABLE FLUOROPOLYMER COMPOSITIONS COMPRISING BIS PHTHALONITRILE-CONTAINING COMPOUND AND CURED ARTICLES THEREFROM

TECHNICAL FIELD

A compound comprising two phthalonitrile groups is described for use as an additive and/or curing agent in curable fluoropolymers.

SUMMARY

There is a desire to improve the heat aging properties and/or identify novel curing systems for fluoropolymers.

In one aspect, a curable composition is described comprising (a) a partially fluorinated polymer, wherein the backbone of the partially fluorinated polymer comprises carbon-carbon double bonds or is capable of forming carbon-carbon double bond, (b) a compound of Formula I

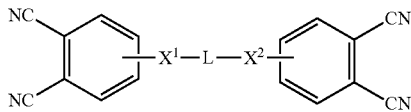

wherein $X^1$ and $X^2$ are independently selected from O or S, and L comprises at least one multivalent benzene group; and (c) optionally a polyhydroxy curative.

In another aspect, a curable composition is described comprising (a) a fluorinated elastomeric gum, wherein the fluorinated elastomeric gum comprises a fluoropolymer, having at least one of —I, —Br, and —CN cure site, (b) a peroxide curing system comprising a peroxide and a coagent, and (c) a compound of Formula I

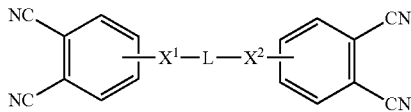

wherein $X^1$ and $X^2$ are independently selected from O or S, and L comprises at least one multivalent benzene group.

In one aspect, the curable compositions from above are cured to form an article such as an o-ring, a seal, a gasket, a hose or a sheet.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more; and

"and/or" is used to indicate one or both stated cases may occur, for example A and/or B includes, (A and B) and (A or B);

"backbone" refers to the main continuous chain of the polymer;

"crosslinking" refers to connecting two pre-formed polymer chains using chemical bonds or chemical groups;

"cure site" refers to functional groups, which may participate in crosslinking;

"interpolymerized" refers to monomers that are polymerized together to form a polymer backbone;

"monomer" is a molecule which can undergo polymerization which then form part of the essential structure of a polymer;

"perfluorinated" means a group or a compound derived from a hydrocarbon wherein all hydrogen atoms have been replaced by fluorine atoms. A perfluorinated compound may however still contain other atoms than fluorine and carbon atoms, like oxygen atoms, chlorine atoms, bromine atoms and iodine atoms; and "polymer" refers to a macrostructure having a number average molecular weight (Mn) of at least 30,000 dalton, at least 50,000 dalton, at least 100,000 dalton, at least 300,000 dalton, at least 500,000 dalton, at least, 750,000 dalton, at least 1,000,000 dalton, or even at least 1,500,000 dalton and not such a high molecular weight as to cause premature gelling of the polymer.

As used here, and known in the art, the horizontal line intersecting the benzene ring as shown in this structure

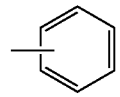

represents a bond that is attached to any one of the vertices of the ring.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

As used herein, "comprises at least one of" A, B, and C refers to element A by itself, element B by itself, element C by itself, A and B, A and C, B and C, and a combination of all three.

The present disclosure is directed toward compounds containing two phthalonitrile groups. These compounds can be used in curable fluoropolymer compositions as an additive, a curing agent, and/or a curing coagent.

Bis Phthalonitrile-Containing Compound

The bis phthalonitrile-containing compounds of the present disclosure are according to Formula (I):

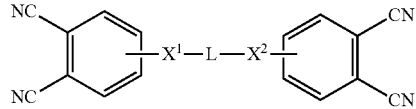

wherein $X^1$ and $X^2$ are independently selected from O or S, and L comprises at least one multivalent benzene group. In Formula (I), the $X^1$-L-$X^2$ group is bonded ortho or meta to one of the nitrile (—C≡N) groups. L is a multivalent linking group which comprises at least one multivalent benzene ring. In one embodiment, the at least one multivalent benzene group may be a divalent, trivalent, or tetravalent benzene group.

In one embodiment, L is

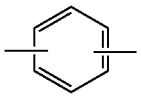

where the two horizontal lines represent (i) a bond between one vertex of the benzene ring and $X^1$ and (ii) a bond between a different vertex of the benzene ring and $X^2$. These two bonds may be ortho, meta, or para to each other. In addition to the two bonds between the benzene ring and $X^1$, and the benzene ring and $X^2$, there may be other non-functional groups bonded to the benzene group, which do not cause steric hindrance, such as at least one methyl, methoxy, ethyl, and/or ethoxy group.

In another embodiment, L comprises more than one multivalent benzene ring group such as:

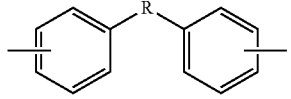

where R is selected from the group consisting of —S—, —O—, —C(CF$_3$)$_2$—, —C(CH$_3$)$_2$—, —CH$_2$—, —SO$_2$—, —C(=O)—, and —C(CH$_3$)$_2$—C$_6$H$_4$—C(CH$_3$)$_2$—. In the above structure for L, the bonds linking L to $X^1$ and $X^2$ of the bis phthalonitrile-containing compound can be in any position with respect to the R group. For example, the bonds can independently be ortho, meta, or para to the R group. More preferably, the bonds are either both ortho, both meta, or both para with respect to the R group. In addition to the two bonds between the benzene ring and $X^1$, and the benzene ring and R, there may be other non-functional groups bonded to the benzene group, which do not cause steric hindrance, such as at least one methyl, methoxy, ethyl, and/or ethoxy group. Similarly, in addition to the two bonds between the benzene ring and $X^2$, and the benzene ring and R, there may be other non-functional groups bonded to the benzene group, which do not cause steric hindrance.

Exemplary compounds of Formula (I) include:

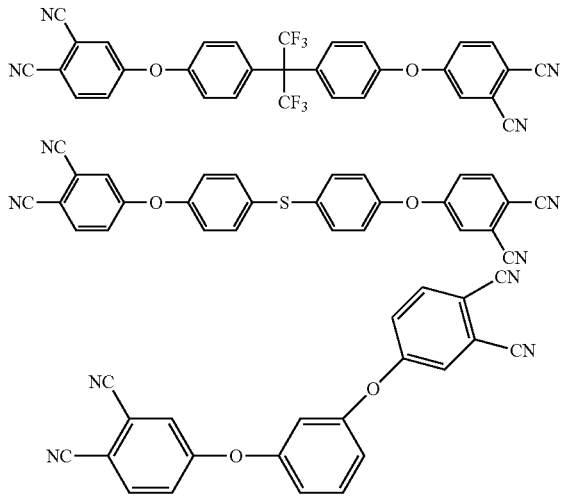

Curable Composition 1:

In one embodiment of the present disclosure, the bis phthalonitrile-containing compound is combined with an amorphous partially fluorinated polymer comprising carbon-carbon double bonds and/or is capable of forming carbon-carbon double bonds along the polymer chain to form a fluoroelastomer.

The amorphous partially fluorinated polymer is a polymer comprising at least one carbon-hydrogen bond and at least one carbon-fluorine bond on the backbone of the polymer. In one embodiment, the amorphous partially fluorinated polymer is highly fluorinated, wherein at least 60, 70, 80, or even 90% of the polymer backbone comprises C—F bonds.

The amorphous fluoropolymer of the present disclosure also comprises carbon-carbon double bonds and/or is capable of forming carbon-carbon double bonds along the polymer chain. In one embodiment, the partially fluorinated amorphous fluoropolymer comprises carbon-carbon double bonds along the backbone of the partially fluorinated amorphous fluoropolymer or is capable of forming carbon-carbon double bonds along the backbone of the partially fluorinated amorphous fluoropolymer. In another embodiment, the partially fluorinated amorphous fluoropolymer comprises carbon-carbon double bonds or is capable of forming carbon-carbon double bonds in a pendent group off of the backbone of the partially fluorinated amorphous fluoropolymer.

The fluoropolymer capable of forming carbon-carbon double bonds means that the fluoropolymer contains units capable of forming double bonds. Such units include, for example, two adjacent carbons along the polymer backbone or pendent side chain, wherein a hydrogen is attached to the first carbon and a leaving group is attached to the second carbon. During an elimination reaction (e.g., thermal reaction, and/or use of acids or bases), the leaving group and the hydrogen leave forming a double bond between the two carbon atoms. An exemplary leaving group includes: a halide, an alkoxide, a hydroxide, a tosylate, a mesylate, an amine, an ammonium, a sulfide, a sulfonium, a sulfoxide, a sulfone, and combinations thereof. Also contemplated would be a fluoropolymer comprising adjacent carbons either having both bromine or both iodine atoms attached resulting in the leaving of $Br_2$ or $I_2$.

The amorphous partially fluorinated polymer comprises a plurality of these groups (carbon-carbon double bonds or groups capable of forming double bonds) to result in a sufficient cure. Generally, this means at least 0.1, 0.5, 1, 2, or even 5 mol % at most 7, 10, 15, or even 20 mol % (i.e., moles of these carbon-carbon double bonds or precursors thereof per mole of polymer).

In one embodiment, the amorphous partially fluorinated polymer is derived from at least one hydrogen containing monomer such as vinylidene fluoride.

In one embodiment, the amorphous partially fluorinated polymer comprises adjacent copolymerized units of vinylidene fluoride (VDF) and hexafluoropmpylene (HFP); copolymerized units of VDF (or tetrafluoroethylene) and a fluorinated comonomer capable of delivering an acidic hydrogen atom to the polymer backbone, such as trifluoroethylene; vinyl fluoride; 3,3,3-trifluoropropene-1; pentafluoropropene (e.g., 2-hydropentafluoropropylene and 1-hydropentafluoropropylene); 2,3,3,3-tetrafluoropropene; and combinations thereof.

In some embodiments, small amounts (e.g., less than 10, 5, 2, or even 1 wt %) of additional monomers may be added so long as the amorphous partially fluorinated polymer is able to be cured with the compound of Formula I as disclosed herein, and optionally with a polyhydroxy curative.

In one embodiment, the amorphous fluoropolymer is additionally derived from a hydrogen containing monomer including: pentafluoropropylene (e.g., 2-hydropentafluropropylene), propylene, ethylene, isobutylene, and combinations thereof.

In one embodiment, the amorphous fluoropolymer is additionally derived from a perfluorinated monomer. Exemplary perfluorinated monomers include: hexafluoropropene; tetrafluoroethylene; chlorotrifluoroethylene; perfluoro ether monomers, and combinations thereof.

Exemplary perfluoro ether monomers are of the Formula (II)

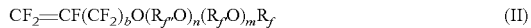

$$CF_2=CF(CF_2)_bO(R_{f'}O)_n(R_{f'}O)_mR_f \qquad (II)$$

where $R_{f'}$ and $R_{f'}$ are independently linear or branched perfluoroalkylene radical groups comprising 2, 3, 4, 5, or 6 carbon atoms, m and n are independently an integer selected from 0, 1, 2, 3, 4, 5, 6, 7, 8, 9, and 10, and $R_f$ is a perfluoroalkyl group comprising 1, 2, 3, 4, 5, or 6 carbon atoms. Exemplary perfluoroalkyl vinyl ether monomers include: perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether, perfluoro-methoxy-methylvinylether ($CF_3$—O—$CF_2$—O—CF=$CF_2$), and $CF_3$—($CF_2$)$_2$—O—CF($CF_3$)—$CF_2$—O—CF($CF_3$)—$CF_2$—O—CF=$CF_2$. Exemplary perfluoroalkyl allyl ether monomers include: perfluoro (methyl allyl) ether ($CF_2$=CF—$CF_2$—O—$CF_3$), perfluoro (ethyl allyl) ether, perfluoro (n-propyl allyl) ether, perfluoro-2-propoxypropyl allyl ether, perfluoro-3-methoxy-n-propylallyl ether, perfluoro-2-methoxy-ethyl allyl ether, perfluoro-methoxy-methyl allyl ether, and $CF_3$—($CF_2$)$_2$—O—CF($CF_3$)—$CF_2$—O—CF($CF_3$)—$CF_2$—O—$CF_2CF$=$CF_2$.

Exemplary types of amorphous partially fluorinated polymers include those comprising interpolymerized units derived from (i) vinylidene fluoride, tetrafluoroethylene, and propylene; (iii) vinylidene fluoride with hexafluoropropylene; (iv) hexafluoropropylene, tetrafluoroethylene, and vinylidene fluoride; (v) hexafluoropropylene and vinylidene fluoride, (ix) tetrafluoroethylene, propylene, and 3,3,3-trifluoropropene; (x) tetrafluoroethylene, and propylene; and (xvi) combinations thereof.

In one embodiment of the present disclosure, the amorphous partially fluorinated polymer is cured with the compound according to Formula I and is substantially free of a traditional curative (such as peroxide, polyhydroxy, and/or triazine cure systems). In one embodiment, the curable composition comprising the amorphous partially fluorinated polymer and the compound according to Formula I is substantially free (i.e., having less than 1, 0.5, 0.1, 0.05, 0.01 or even 0.005% by weight or even none detectable in the curable composition) of an aromatic diamine such as 2,2-bis(3-amino-4-hydroxyphenyl)hexafluoropropane. Typically, at least 0.05, 0.1 or even 1 part; and at most 2, 4, 6, or even 10 parts by weight of the compound according to Formula I is used per 100 parts by weight of amorphous partially fluorinated polymer. The extent of the cure and performance can be measured by hardness, strength, strain to failure and/or compression set.

In another embodiment of the present disclosure, the amorphous partially fluorinated polymer is cured with the compound according to Formula I and a polyhydroxy compound. Polyhydroxy compounds include those known in the art to function as a crosslinking agent or co-curative for elastomers, such as those polyhydroxy compounds disclosed in U.S. Pat. No. 3,876,654 (Pattison), and U.S. Pat. No. 4,233,421 (Worm), which are both herein incorporated by reference. Representative examples include aromatic polyhydroxy compounds, preferably any one of the following: di-, tri-, and tetrahydroxybenzenes, naphthalenes, and anthracenes, and bisphenols. Exemplary aromatic polyhydroxy compounds include: 4,4'-hexafluoroisopropylidenyl bisphenol, known more commonly as bisphenol AF. Further useful examples include 4,4'-dihydroxydiphenyl sulfone (also known as Bisphenol S) and 4,4'-isopropylidenyl bisphenol (also known as bisphenol A) or 4,4'(perfluoropropane-2,2-diyl)diphenol, dihydroxybenzophenone, hydroquinone, 2,4,6-trimercapto-S-triazine, 4,4'-thiodiphenol, and a metal salt thereof.

Typically, at least 0.05, 0.1 or even 1 part by weight; and at most 2, 4, 6, or even 10 parts by weight of the compound according to Formula I is used per 100 grams of amorphous partially fluorinated polymer and at least 0.05, 0.1 or even 1 part by weight; and at most 2, 2.5, 3, 4, 4.5, or even 5 parts by weight of amount of the polyhydroxy compound is used per 100 grams of amorphous partially fluorinated polymer.

Curable Composition 2

In another embodiment of the present disclosure, the bis phthalonitrile-containing compound is combined with a fluorinated elastomeric gum. The fluorinated elastomeric gum comprises a fluorinated polymer including a cure-site (I, Br, and/or CN). The mixture (i.e., the bis phthalonitrile-containing compound and the fluorinated elastomeric gum) are cured to form a fluoroelastomer.

In one embodiment, the fluorinated polymer contains cure sites which facilitate crosslinking of the polymer in appropriate cure systems. These cure sites comprise at least one of iodine, bromine, and/or nitrile. The polymer may be polymerized in the presence of a chain transfer agent and/or cure site monomer to introduce cure sites into the polymer. Such cure site monomers and chain transfer agents are known in the art. Exemplary chain transfer agents include: an iodo-chain transfer agent, a bromo-chain transfer agent, or a chloro-chain transfer agent. For example, suitable iodo-chain transfer agent in the polymerization include the formula of Rh, where (i) R is a perfluoroalkyl or chloroperfluoroalkyl group having 3 to 12 carbon atoms; and (ii) x=1 or 2. The iodo-chain transfer agent may be a perfluorinated iodo-compound. Exemplary iodo-perfluoro-compounds include 1,3-diiodoperfluoropropane, 1,4-diiodoperfluorobutane, 1, 6-diiodoperfluorohexane, 1,8-diiodoperfluorooctane, 1,10-diiodoperfluorodecane, 1,12-diiodoperfluorododecane, 2-iodo-1,2-dichloro-1,1,2-trifluoroethane, 4-iodo-1, 2,4-trichloroperfluorobutan, and mixtures thereof. In some embodiments, the iodo-chain transfer agent is of the formula I($CF_2$)$_n$—O—$R_f$—($CF_2$)$_m$I, wherein n is 1, 2, 3, 4, 5, 6, 7, 8, 9, or 10, m is is 1, 2, 3, 4, 5, 6, 7, 8, 9, or 10 and $R_f$ is a partially fluorinated or perfluorinated alkylene segment, which can be linear or branched and optionally comprises at least one catenated ether linkage. Exemplary compounds include: I—$CF_2$—$CF_2$—O—$CF_2$—$CF_2$—I, I—CF($CF_3$)—$CF_2$—O—$CF_2$—$CF_2$—I, I—$CF_2$—$CF_2$—O—CF($CF_3$)—$CF_2$—O—$CF_2$—$CF_2$—I, I—(CF($CF_3$)—$CF_2$—O)$_2$—$CF_2$—$CF_2$—I, I—$CF_2$—$CF_2$—O—($CF_2$)$_2$—O—$CF_2$—$CF_2$—I, I—$CF_z$—$CF_2$O—($CF_2$)$_3$—O—$CF_2$—$CF_2$—I, and I—$CF_2$—$CF_2$—O—($CF_2$)$_4$—O—$CF_2$—$CF_2$—I, I—$CF_2$—$CF_2$—O—$CF_2$—$CF_2$—I, and I—$CF_2$—$CF_2$—$CF_2$—O—CF($CF_3$)—$CF_2$—O—$CF_2$—$CF_2$—I. In some embodiments, the bromine is derived from a brominated chain transfer agent of the formula: $RBr_x$, where (i) R is a perfluoroalkyl or chloroperfluoroalkyl group having 3 to 12 carbon atoms; and (ii) x=1 or 2. The chain transfer agent may be a perfluorinated bromo-compound.

Cure site monomers, if used, comprise at least one of a bromine, iodine, and/or nitrile cure moiety.

In one embodiment, the cure site monomers may be of the formula: (a) $CX_2=CX(Z)$, wherein: (i) X each is independently H or F; and (ii) Z is I, Br, $R_f$—U wherein U=I or Br and $R_f$=a perfluorinated or partially perfluorinated alkylene group optionally containing ether linkages or (b) $Y(CF_2)_qY$, wherein: (i) Y is independently selected from Br or I or Cl and (ii) q=1-6. In addition, non-fluorinated bromo- or iodo-olefins, e.g., vinyl iodide and allyl iodide, can be used. Exemplary cure site monomers include: $CH_2=CHI$, $CF_2=CHI$, $CF_2=CFI$, $CH_2=CHCH_2I$, $CF_2=CFCF_2I$, $ICF_2CF_2CF_2CF_2I$, $CH_2=CHCF_2CF_2I$, $CF_2=CFCH_2CH_2I$, $CF_2=CFCF_2CF_2I$, $CH_2=CH(CF_2)_6CH_2CH_2I$, $CF_2=CFOCF_2CF_2I$, $CF_2=CFOCF_2CF_2CF_2I$, $CF_2=CFOCF_2CF_2CH_2I$, $CF_2=CFCF_2OCH_2CH_2I$, $CF_2=CFO(CF_2)_3$—$OCF_2CF_2I$, $CH_2=CHBr$, $CF_2=CHBr$, $CF_2=CFBr$, $CH_2=CHCH_2Br$, $CF_2=CFCF_2Br$, $CH_2=CHCF_2CF_2Br$, $CF_2=CFOCF_2CF_2Br$, $CF_2=CFCl$, I—$CF_2$—$CF_2CF_2$—O—CF=$CF_2$, I—$CF_2$—$CF_2CF_2$—O—$CF_2CF=CF_2$, I—$CF_2CF=CF_2$, I—$CF_2$—$CF_2$—O—$CF_2CF=CF_2$, I—$CF(CF_3)$—$CF_2$—O—CF=$CF_2$, I—$CF(CF_3)$—$CF_2$—O—$CF_2$—CF=$CF_2$, I—$CF_2$—$CF_2$—O—$CF(CF_3)$—$CF_2$—O—CF=$CF_2$, I—$CF_2$—$CF_2$—O—$CF(CF_3)$—$CF_2$—O—$CF_2$—CF=$CF_2$, I—$CF_2$—$CF_2$—(O—(CF $(CF_3)$—$CF_2)_2$—O—CF=$CF_2$, I—$CF_2$—$CF_2$—(O—(CF $(CF_3)$—$CF_2)_2$—O—$CF_2$—CF=$CF_2$, Br—$CF_2$—$CF_2$—O—$CF_2$—CF=$CF_2$, Br—$CF(CF_3)$—$CF_2$—O—CF=$CF_2$, I—$CF_2$—$CF_2$—$CF_2$—O—$CF(CF_3)$—$CF_2$—O—CF=$CF_2$, I—$CF_2$—$CF_2$—$CF_2$—O—$CF(CF_3)$—$CF_2$—O—$CF_2$—CF=$CF_2$, I—$CF_2$—$CF_2$—$CF_2$—(O—$(CF(CF_3)$—$CF_2)_2$—O—CF=$CF_2$, I—$CF_2$—$CF_2$—$CF_2$—O—$(CF(CF_3)$—$CF_2$—O$)_2$—$CF_2$—CF=$CF_2$, Br—$CF_2$—$CF_2$—$CF_2$—O—CF=$CF_2$, Br—$CF_2$—$CF_2$—$CF_2$—O—$CF_2$—CF=$CF_2$, I—$CF_2$—$CF_2$—O—$(CF_2)_2$—O—CF=$CF_2$, I—$CF_2$—$CF_2$—O—$(CF_2)_3$—O—CF=$CF_2$, I—$CF_2$—$CF_2$—O—$(CF_2)_4$—O—CF=$CF_2$, I—$CF_2$—$CF_2$—O—$(CF_2)_2$—O—$CF_2$—CF=$CF_2$, I—$CF_2$—$CF_2$—O—$(CF_2)_3$—O—$CF_2$—CF=$CF_2$, I—$CF_2$—$CF_2$—O—$(CF_2)_2$—O—$CF(CF_3)$—$CF_2$—O—CF=$CF_2$, I—$CF_2$—$CF_2$—O—$(CF_2)_2$—O—CF $(CF_3)CF_2$—O—$CF_2$—CF=$CF_2$, Br—$CF_2$—$CF_2$—O—$(CF_2)_2$—O—CF=$CF_2$, Br—$CF_2$—$CF_2$—O—$(CF_2)_3$—O—CF=$CF_2$, Br—$CF_2$—$CF_2$—O—$(CF_2)_4$—O—CF=$CF_2$, and Br—$CF_2$—$CF_2$—O—$(CF_2)_2$—O—$CF_2$—CF=$CF_2$. Examples of nitrile containing cure site monomers correspond to the following formulae: $CF_2=CF$—$CF_2$—O—Rf-CN; $CF_2=CFO(CF_2)_rCN$; $CF_2=CFO[CF_2CF(CF_3)O]_p(CF_2)_vOCF(CF_3)CN$; $CF_2=CF[OCF_2CF(CF_3)]_kO(CF_2)_uCN$; wherein, r represents an integer of 2 to 12; p represents an integer of 0 to 4; k represents 1 or 2; v represents an integer of 0 to 6; u represents an integer of 1 to 6; and Rf is a perfluoroalkylene or a bivalent perfluoroether group. Specific examples of nitrile containing fluorinated monomers include, but are not limited to, perfluoro (8-cyano-5-methyl-3,6-dioxa-1-octene), $CF_2=CFO(CF_2)_5CN$, and $CF_2=CFO(CF_2)_3OCF(CF_3)CN$.

In one embodiment, the fluorinated polymer of the present disclosure comprises at least 0.1, 0.5, 1, 2, or even 2.5 wt % of iodine, bromine, and/or nitrile groups versus the total weight of fluorinated polymer. In one embodiment, the fluorinated polymer comprises no more than 3, 5, or even 10 wt % of iodine, bromine, and/or nitrile groups versus the total weight of the fluorinated polymer.

As used herein the phrase "fluorinated elastomeric gum" refers to a fluoropolymer that can be processed as a traditional elastomer. To be processed as a traditional elastomer means that the fluoropolymer that can be processed with a two-roll mill or an internal mixer. Mill blending is a process that rubber manufacturers use to combine the polymer gum with the requisite curing agents and/or additives. In order to be mill blended, the fluorinated elastomeric gum must have a sufficient modulus. In other words, not too soft that it sticks to the mill, and not too stiff that it cannot be banded onto mill. In one embodiment, the fluorinated elastomeric gum of the present disclosure has a modulus of at least 0.1, 0.3, or even 0.5 MPa (megaPascals); and at most 2.5, 2.2, or even 2.0 MPa at 100° C. as measured at a strain of 1% and a frequency of 1 Hz (Hertz).

The fluorinated elastomeric gum may be perfluorinated or partially fluorinated. As disclosed herein, in a perfluorinated polymer, the carbon-hydrogen bonds along the backbone of the polymer are all replaced with carbon-fluorine bonds and optionally some carbon-chlorine bonds. It is noted that the backbone of the polymer excludes the sites of initiation and termination of the polymer. As disclosed herein, in a partially fluorinated polymer, the polymer comprises at least one carbon-hydrogen bond and at least one carbon-fluorine bond on the backbone of the polymer excluding the sites of initiation and termination of the polymer. In one embodiment, the fluorinated polymer is highly fluorinated, wherein at least 50, 60, 70, 80, or even 85% of the polymer backbone comprises C—F bonds and at most 90, 95, or even 99%.

In one embodiment, the fluorinated elastomeric gum may be derived from one or more fluorinated monomer(s) such as tetrafluoroethylene (TFE), vinyl fluoride (VF), vinylidene fluoride (VDF), hexafluoropropylene (HFP), pentafluoropropylene, trifluoroethylene, trifluorochloroethylene (CTFE), perfluorovinyl ethers, perfluoroallyl ethers, and combinations thereof.

In one embodiment, perfluorovinyl ethers are of the Formula III

$$CF_2=CFO(R_fO)_mR_f \qquad (III)$$

where $R_f$ is a linear or branched perfluoroalkylene radical groups comprising 2, 3, 4, 5, or 6 carbon atoms, m is an integer selected from 0, 1, 2, 3, 4, 5, 6, 7, 8, 9, and 10, and $R_f$ is a perfluoroalkyl group comprising 1, 2, 3, 4, 5, or 6 carbon atoms. Exemplary perfluorovinyl ether monomers include: perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether, perfluoro-methoxy-methylvinylether ($CF_3$—O—$CF_2$—O—CF=$CF_2$), and $CF_3$—$(CF_2)_2$—O—$CF(CF_3)$—$CF_2$—O—$CF(CF_3)$—$CF_2$—O—CF=$CF_2$, and combinations thereof.

In one embodiment, perfluoroallyl ethers are of the Formula IV

$$CF_2=CFCF_2O(R_{f''}O)_n(R_{f'}O)_mR_f \qquad (IV)$$

where $R_{f''}$, and $R_{f'}$ are independently linear or branched perfluoroalkylene radical groups comprising 2, 3, 4, 5, or 6 carbon atoms, m and n are independently an integer selected from 0, 1, 2, 3, 4, 5, 6, 7, 8, 9, and 10, and $R_f$ is a perfluoroalkyl group comprising 1, 2, 3, 4, 5, or 6 carbon atoms. Exemplary perfluoroallyl ether monomers include: perfluoro (ethyl allyl) ether, perfluoro (n-propyl allyl) ether, perfluoro-2-propoxypropyl allyl ether, perfluoro-3-methoxy-n-propylallyl ether, perfluoro-2-methoxy-ethyl allyl ether, perfluoro-methoxy-methyl allyl ether, and $CF_3$—

$(CF_2)_2$—O—$CF(CF_3)$—$CF_2$—O—$CF(CF_3)$—$CF_2$—O—$CF_2CF$=$CF_2$, and combinations thereof.

It is known by those of skill in the art to modify the fluorinated elastomeric gum during the polymer formation by the addition of small amounts of other copolymerizable monomers, which may or may not contain fluorine substitution, e.g. ethylene, propylene, butylene and the like. Use of these additional monomers (i.e., comonomers) is within the scope of the present disclosure. Generally, these additional monomers would be used at less than 25 mole percent of the fluoropolymer, preferably less than 10 mole percent, and even less than 3 mole percent.

In one embodiment, the fluorinated elastomeric gum is a random copolymer, which is amorphous, meaning that there is an absence of long-range order (i.e., in long-range order the arrangement and orientation of the macromolecules beyond their nearest neighbors is understood). An amorphous fluoropolymer has no detectable crystalline character by DSC (differential scanning calorimetry), meaning that if studied under DSC, the fluoropolymer would have no melting point or melt transitions with an enthalpy more than 0.002, 0.01, 0.1, or even 1 Joule/g from the second heat of a heat/cool/heat cycle, when tested using a DSC thermogram with a first heat cycle starting at −85° C. and ramped at 10° C./min to 350° C., cooling to −85° C. at a rate of 10° C./min and a second heat cycle starting from −85° C. and ramped at 10° C./min to 350° C. Exemplary amorphous random copolymers may include: copolymers comprising TFE and perfluorinated vinyl ethers monomeric units (such as copolymers comprising TFE and PMVE, and copolymers comprising TFE and PEVE); copolymers comprising TFE and perfluorinated allyl ethers monomeric units; copolymers comprising TFE and propylene monomeric units; copolymers comprising TFE, propylene, and VDF monomeric units; copolymers comprising VDF and HFP monomeric units; copolymers comprising TFE, VDF, and HFP monomeric units; copolymers comprising TFE and ethyl vinyl ether (EVE) monomeric units; copolymers comprising TFE and butyl vinyl ether (BVE) monomeric units; copolymers comprising TFE, EVE, and BVE monomeric units; copolymers comprising VDF and perfluorinated vinyl ethers monomeric units (such as copolymers comprising VDF and $CF_2$=$CFOC_3F_7$) monomeric units; an ethylene and HFP monomeric units; copolymers comprising CTFE and VDF monomeric units; copolymers comprising TFE and VDF monomeric units; copolymers comprising TFE, VDF and perfluorinated vinyl ethers monomeric units (such as copolymers comprising TFE, VDF, and PMVE) monomeric units; copolymers comprising VDF, TFE, and propylene monomeric units; copolymers comprising TFE, VDF, PMVE, and ethylene monomeric units; copolymers comprising TFE, VDF, and perfluorinated vinyl ethers monomeric units (such as copolymers comprising TFE, VDF, and $CF_2$=$CFO(CF_2)_3OCF_3$) monomeric units; and combinations thereof. In one embodiment, the fluorinated polymer is not a copolymer comprising VDF and HFP monomeric units.

In one embodiment, the fluorinated elastomeric gum is a block copolymer in which chemically different blocks or sequences are covalently bonded to each other, wherein the blocks have different chemical compositions and/or different glass transition temperatures. In one embodiment, the block copolymer comprises a first block, A block, which is a semi-crystalline segment. If studied under a differential scanning calorimetry (DSC), this block would have at least one melting point temperature ($T_m$) of greater than 70° C. and a measurable enthalpy, for example, greater than 0 J/g (Joules/gram). The second block, or B block, is an amorphous segment, meaning that there is an absence of long-range order (i.e., in long-range order the arrangement and orientation of the macromolecules beyond their nearest neighbors is understood). The amorphous segment has no detectable crystalline character by DSC. If studied under DSC, the B block would have no melting point or melt transitions with an enthalpy more than 2 milliJoules/g by DSC. In one embodiment, the A block is copolymer derived from at least the following monomers: tetrafluoroethylene (TFE), hexafluoropropylene (HFP), and vinylidene fluoride (VDF). In one embodiment, the A block comprises 30-85 wt (weight) % TFE; 5-40 wt % HFP; and 5-55 wt % VDF; 30-75 wt % TFE; 5-35 wt % HFP; and 5-50 wt % VDF; or even 40-70 wt % TFE; 10-30 wt % HFP; and 10-45 wt % VDF. In one embodiment, the B block is a copolymer derived from at least the following monomers: hexafluoropropylene (HFP), and vinylidene fluoride (VDF). In one embodiment, the B block comprises 25-65 wt % VDF and 15-60 wt % HFP; or even 35-60 wt % VDF and 25-50 wt % HFP. Monomers, in addition, to those mentioned above, may be included in the A and/or B blocks. Generally, the weight average of the A block and B block are independently selected from at least 1000, 5000, 10000, or even 25000 daltons; and at most 400000, 600000, or even 800000 daltons. Such block copolymers are disclosed in WO 2017/013379 (Mitchell et al.); and U.S. Provisional Appl. Nos. 62/447,675, 62/447,636, and 62/447,664, each filed 18 Jan. 2017; all of which are incorporated herein by reference.

In one embodiment, the amount of the compound of Formula I in curable composition 2 is at least 0.05, 0.1 or even 1 part by weight; and at most 2, 4, 6, or even 10 parts by weight per 100 parts by weight of the fluorinated polymer.

The fluoropolymer of curable composition 2 can be cured with a peroxide curing agent. In one embodiment, the peroxide is an organic peroxide, preferably, a tertiary butyl peroxide having a tertiary carbon atom attached to peroxy oxygen.

Exemplary peroxides include: benzoyl peroxide, dicumyl peroxide, di-tert-butyl peroxide, 2,5-di-methyl-2,5-di-tert-butylperoxyhexane, 2,4-dichlorobenzoyl peroxide, 1,1-bis(tert-butylperoxy)-3,3,5-trimethylchlorohexane, tert-butyl peroxy isopropylcarbonate (TBIC), tert-butyl peroxy 2-ethylhexyl carbonate (TBEC), tert-amyl peroxy 2-ethylhexyl carbonate, tert-hexylperoxy isopropyl carbonate, carbonoperoxoic acid, O,O'-1,3-propanediyl OO,OO'-bis(1,1-dimethylethyl) ester, tert-butylperoxy benzoate, t-hexyl peroxy-2-ethylhexanoate, t-butyl peroxy-2-ethylhexanoate, di(4-methylbenzoyl) peroxide, laurel peroxide and cyclohexanone peroxide. Other suitable peroxide curatives are listed in U.S. Pat. No. 5,225,504 (Tatsu et al.), incorporated herein by reference.

The amount of peroxide used generally will be at least 0.1, 0.2, 0.4, 0.6, 0.8, 1, 1.2, or even 1.5; at most 2, 2.25, 2.5, 2.75, 3, 3.5, 4, 4.5, 5, or even 5.5 parts by weight per 100 parts by weight of the fluorinated polymer.

Coagents are reactive additives used to improve the peroxide curing efficiency by rapidly reacting with radicals and potentially suppressing side reactions and/or generating additional crosslinks. The coagent forms a radical through hydrogen abstraction or addition of a radical from the peroxide, which can then react with the polymer through the Br, I, and/or nitrile sites. The coagents are multifunctional polyunsaturated compounds, which are known in the art and include allyl-containing cyanurates, isocyanurates, and phthalates, homopolymers of dienes, and copolymers of dienes and vinyl aromatics. A wide variety of useful coagents are commercially available including di- and triallyl compounds, di vinyl benzene, vinyl toluene, vinyl pyridine, 1,2-cis-polybutadiene and their derivatives. Exemplary coagents include a diallyl ether of glycerin, triallylphosphoric acid, diallyl adipate, diallylmelamine and triallyl isocyanurate (TAIC), tri(methyl)allyl isocyanurate (TMAIC), tri(methyl)allyl cyanurate, poly-triallyl isocyanurate (poly-TAIC), xylylene-bis(diallyl isocyanurate) (XBD), N,N'-m-phenylene bismaleimide, diallyl phthalate, tris(diallylamine)-s-triazine, triallyl phosphite, 1,2-polybutadiene, ethyleneglycol diacrylate, diethyleneglycol diacrylate, and combinations thereof. Exemplary partially fluorinated compounds comprising two terminal unsaturation sites include: $CH_2=CH—R_{f1}—CH=CH_2$ wherein $R_{f1}$ may be a perfluoroalkylene of 1 to 8 carbon atoms and a fluorine-containing TAIC such as those disclosed in U.S. Pat. No. 6,191,233 (Kishine et al.), incorporated herein by reference.

In one embodiment, the composition comprises a peroxide and a coagent, wherein the amount of coagent used generally will be at least 0.1, 0.5, or even 1 part by weight per 100 parts by weight of the fluorinated polymer; and at most 2, 2.5, 3, or even 5 parts by weight per 100 parts by weight of the fluorinated polymer.

Curable Compositions and Processing

The curable compositions of 1 and 2 above can also contain a wide variety of additives of the type normally used in the preparation of elastomeric compositions, such as acid acceptors, process aides, pigments, fillers, pore-forming agents, and those known in the art.

Such fillers include: an organic or inorganic filler such as clay, silica ($SiO_2$), alumina, iron red, talc, diatomaceous earth, barium sulfate, wollastonite ($CaSiO_3$), calcium carbonate ($CaCO_3$), calcium fluoride, titanium oxide, iron oxide and carbon black fillers, a polytetrafluoroethylene powder, PFA (TFE/perfluorovinyl ether copolymer) powder, an electrically conductive filler, a heat-dissipating filler, and the like may be added as an optional component to the composition. Those skilled in the art are capable of selecting specific fillers at required amounts to achieve desired physical characteristics in the vulcanized compound. The filler components may result in a compound that is capable of retaining a preferred elasticity and physical tensile, as indicated by an elongation and tensile strength value, while retaining desired properties such as retraction at lower temperature (TR-10).

In one embodiment, the composition comprises less than 40, 30, 20, 15, or even 10% by weight of the inorganic filler.

Conventional adjuvants may also be incorporated into the composition of the present disclosure to enhance the properties of the resulting composition. For example, acid acceptors may be employed to facilitate the cure and thermal stability of the compound. Suitable acid acceptors may include magnesium oxide, lead oxide, calcium oxide, calcium hydroxide, dibasic lead phosphite, zinc oxide, barium carbonate, strontium hydroxide, calcium carbonate, hydrotalcite, alkali stearates, magnesium oxalate, or combinations thereof. The acid acceptors are preferably used in amounts ranging from about 1 to about 20 parts per 100 parts by weight of the polymer.

The curable fluoropolymer compositions may be prepared by mixing the bis phthalonitrile-containing compound of Formula I, the fluoropolymer, and any additional components in conventional rubber processing equipment to provide a solid mixture, i.e. a solid polymer containing the additional ingredients, also referred to in the art as a "compound". This process of mixing the ingredients to produce such a solid polymer composition containing other ingredients is typically called "compounding". Such equipment includes rubber mills, internal mixers, such as Banbury mixers, and mixing extruders. The temperature of the mixture during mixing typically will not rise above about 120° C. During mixing the components and additives are distributed uniformly throughout the resulting fluorinated polymer "compound" or polymer sheets. The "compound" can then be extruded or pressed in a mold, e.g., a cavity or a transfer mold and subsequently be oven-cured. In an alternative embodiment curing can be done in an autoclave.

Pressing of the compounded mixture (i.e., press cure) is typically conducted at a temperature of about 120-220° C., preferably about 140-200° C., for a period of about 1 minute to about 15 hours, usually for about 1-15 minutes. A pressure of about 700-20,000 kPa, preferably about 3400-6800 kPa, is typically used in molding the composition. The molds first may be coated with a release agent and prebaked.

The molded vulcanizate can be post cured in an oven at a temperature of about 140-240° C., preferably at a temperature of about 160-230° C., for a period of about 1-24 hours or more, depending on the cross-sectional thickness of the sample. For thick sections, the temperature during the post cure is usually raised gradually from the lower limit of the range to the desired maximum temperature. The maximum temperature used is preferably about 260° C., and is held at this value for about 1 hour or more.

In another embodiment, after curing the curable composition 1 of the present disclosure, the resulting fluoroelastomer has improved elongation, but low tensile strength as compared to a composition not including the compound of Formula I.

In one embodiment of the present disclosure, after curing the curable composition 2 of the present disclosure, the resulting fluoroelastomer has improved thermal aging.

In one embodiment, the cured fluoroelastomer of the present disclosure has retained physical properties which are at least 50, 75, 100, or even 125% greater than the same fluoroelastomer not made with the compound of Formula I.

The cured fluoroelastomer is particularly useful as hoses, seals, gaskets, and molded parts in automotive, chemical processing, semiconductor, aerospace, and petroleum industry applications, among others.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Millipore, Saint Louis, Missouri, or may be synthesized by conventional methods.

The following abbreviations are used in this section: g=grams, lb=pounds, cm=centimeters, min=minutes, h=hours, N=newtons, dNm=decinewton meters, MV=Mooney viscosity, ° C.=degrees Celsius, ° F.=degrees Farenheit, PSI=pounds per square inch, MPa=megapascals, mol=moles. Abbreviations for materials used in this section, as well as descriptions of the materials, are provided in Table 1.

TABLE 1

| Material | Details |
|---|---|
| Fluoropolymer A | A perfluoroelastomer derived from about 49.2% of TFE, 50.3% of PMVE and 0.5% of $CF_2$=$CFO(CF_2)_3O(CF_2)_2I$ by weight, 72.2% fluorine content by weight, 0.31% iodine content by weight and Mooney Viscosity ML1 + 10 @ 121° C. of 35. |
| Fluoropolymer B | A fluoroelastomer derived from 60.6 wt % vinylidene fluoride (VDF) and 39.4 wt % hexafluoropropylene (HFP) monomer with 65.9 wt % fluorine content and Mooney Viscosity ML1 + 10 @ 121° C. of 28. |
| Fluoropolymer C | A fluoroelastomer derived from 23 wt % tetrafluoroethylene (TFE), 41 wt % hexafluoropropylene (HFP) and 36 wt % vinylidene fluoride (VDF) monomer with 70 wt % fluorine content, 0.3 wt % iodine content and Mooney Viscosity ML1 + 10 @ 121° C. of 20. |
| Carbon Black | N990 Carbon black commercially available from Cancarb Ltd, Medicine Hat, Alta., Canada |
| Coagent | Triallyl-isocyanurate commercially available under the trade designation "TAIC" from Nippon Kasei Chemical Co. Ltd., Tokyo, Japan |
| Peroxide | 2,5-dimethyl-2,5-di(t-butylperoxy)-hexane, 50% active, available under the trade designation "VAROX DBPH-50" from Vanderbilt Chemicals, LLC., Norwalk, CT. |
| $Ca(OH)_2$ | Calcium Hydroxide |
| MgO | Magnesium Oxide |
| CaO | Calcium Oxide |
| BTPPCl | Benzyl triphenyl phosphonium chloride available from AlfaAesar, Haverhill, MA |
| BF6 Phth | 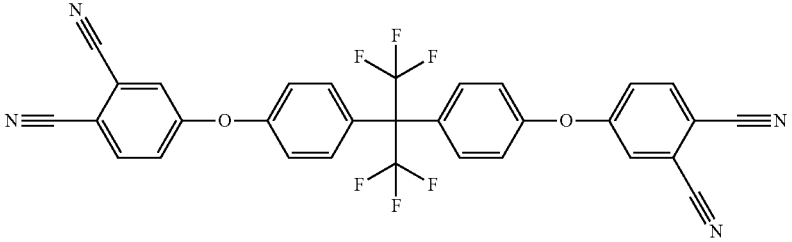 [SMILES: N#Cc1ccc(Oc2ccc(C(c3ccc(Oc4ccc(C#N)c(C#N)c4)cc3)(C(F)(F)F)C(F)(F)F)cc2)cc1C#N] Can be prepared as described below in Preparatory Example 1 |
| BPT Phth | 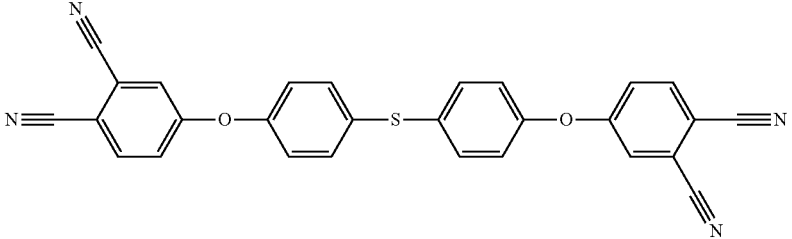 [SMILES: N#Cc1ccc(Oc2ccc(Sc3ccc(Oc4ccc(C#N)c(C#N)c4)cc3)cc2)cc1C#N] Can be prepared as described below in Preparatory Example 2 |
| Resorc Phth | 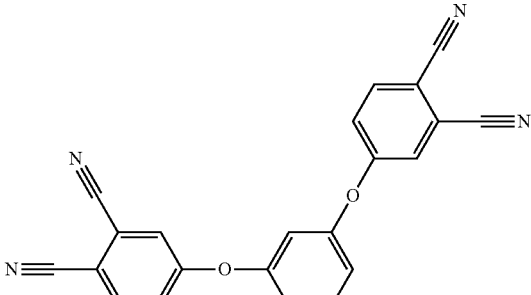 Can be prepared as described below in Preparatory Example 3 |
| DMSO | Dimethyl sulfoxide, available from Sigma-Aldrich |
| Bisphenol T | 4,4'-Thiodiphenol, available from Sigma-Aldrich |

Compounding 200 g polymer batches were compounded with the amounts of materials as listed in Tables 2, 3, 4 and 5 on a two-roll mill.

Physical Properties

Cure Rheology

Cure rheology tests were carried out using uncured, compounded samples using a rheometer (PPA 2000 by Alpha technologies, Akron, OH), in accordance with ASTM D 5289-93a at 177° C., no pre-heat, 12 min elapsed time, and a 0.5 degree arc. Both the minimum torque ($M_L$) and highest torque attained during a specified period of time when no plateau or maximum torque ($M_H$) was obtained were measured. Also measured were the time for the torque to reach a value equal to $M_L+0.5(M_H-M_L)$, (t'50), and the time for the torque to reach $M_L+0.9(M_H-M_L)$, (90). Results are reported in Tables 4 and 5.

Tensile Data

Tensile data was gathered from both press and post cured samples cut to Die D specifications at room temperature in accordance with ASTM 412-06A. Heat aged tensile data was measured on Die D dumbbells. Results are reported in Tables 2, 3, 4 and 5.

Molding O-Rings and Compression Set

O-rings (214, AMS AS568) were molded at 177° C. for 10 min. The press cured O-rings were post-cured at 232° C. for 4 h. The press cured and post cured O-rings were tested for compression set for 70 h at 200° C. in accordance with ASTM D 395-03 Method B and ASTM D 1414-94 with 25% initial deflection. Results are reported as percentages in Tables 2, 3, 4 and 5.

Preparative Example 1: BF6 Phth bis(3,4-dicyanophenyl) ether of 4,4'-(Hexafluoroisopropylidene)diphenol was derived from the nucleophilic substitution reaction of 4-nitrophthalonitrile and 4,4'-(Hexafluoroisopropylidene)diphenol. To a three necked 500 mL reaction flask was added 50.0 g (0.289 mol) of 4-nitrophthalonitrile, 48.55 g (0.144 mol) of 4,4'-(Hexafluoroisopropylidene)diphenol, 49.9 g (0.361 mol) of anhydrous $K_2CO_3$ and 225 g of dry DMSO. The reaction solution was heated to 70° C. and mechanically stirred with sparging nitrogen for 3.5 h. Stirring was ceased, and the reaction salts settled to the bottom of the vessel. Some of the reaction product had begun to crystalize from the reaction liquid. The reaction solution liquid and product were decanted from the reaction salts into a stirring chilled mixture of 250 g of 80/20 methanol/water by mass. Additional product crystallized from the DMSO/methanol/water solution. The reaction salts were washed with 25 g of DMSO, and the wash DMSO decanted into the stirring DMSO/methanol/water solution. The product solids were collected on a Buchner funnel and washed with methanol, water and methanol. The solids were collected in an aluminum pan and were dried of methanol and water in a convection oven at 140° C. for 2 h. The solids were further heated to 250° C. for 15 min which melted the solids and drove off residual DMSO. The product melt was removed from the oven and allowed to cool to ambient temperature. The product, 79.0 g (92.9% yield), had a melt temperature of 231-232° C. by differential scanning calorimetry measurement (DSC Q 2000, TA Instruments, New Castle, DE). The product was identified as the desired compound by infrared analysis and NMR and had a purity of >99%.

Preparative Example 2: BPT Phth bis(3,4-dicyanophenyl) ether of bisphenol T was derived from the nucleophilic substitution reaction of 4-nitrophthalonitrile and bisphenol T. To a three necked 500 mL reaction flask was added 50.0 g (0.289 mol) of 4-nitrophthalonitrile, 31.52 g (0.144 mol) of bisphenol T, 49.9 g (0.361 mol) of anhydrous $K_2CO_3$, and 225 g of dry DMSO. The reaction solution was heated to 70° C. and mechanically stirred with sparging nitrogen for 3.5 h. Stirring was ceased, and the reaction salts settled to the bottom of the vessel. The reaction solution liquid and product were decanted from the reaction salts into a stirring chilled mixture of 250 g of 80/20 methanol/water by mass. The product crystallized from the DMSO/methanol/water solution. The reaction salts were washed with 25 g of DMSO, and the wash DMSO decanted into the stirring DMSO/methanol/water solution. The product solids were collected on a Buchner funnel and washed with methanol, water and methanol. The solids were collected in an aluminum pan and were dried of methanol and water in a convection oven at 140° C. for 2 h. The solids were further heated in a vacuum oven to 200° C. for 1 h which melted the solids and stripped off residual DMSO. The product melt was removed from the oven and allowed to cool to ambient. The product, 60.6 g (89.2% yield), had a melt temperature of 178° C. by differential scanning calorimetry measurement on a TA Instruments DSC Q 2000. The product was identified as the desired compound by infrared analysis and NMR and had a purity of >99%.

Preparative Example 3: Resorc Phth bis(3,4-dicyanophenyl) ether of resorcinol was derived from the nucleophilic substitution reaction of 4-nitrophthalonitrile and resorcinol. To a three necked 500 mL reaction flask was added 50.0 g (0.289 mol) of 4-nitrophthalonitrile, 15.90 g (0.144 mol) of resorcinol, 49.9 g (0.361 mol) of anhydrous $K_2CO_3$, and 175 g of dry DMSO. The reaction solution was heated to 70° C. and mechanically stirred with sparging nitrogen for 3.5 h. Stirring was ceased, and the reaction salts settled to the bottom of the vessel. The reaction solution liquid and product were decanted from the reaction salts into a stirring chilled mixture of 200 g of 80/20 methanol/water by mass. The product crystallized from the DMSO/methanol/water solution. The reaction salts were washed with 25 g of DMSO, and the wash DMSO decanted into the stirring DMSO/methanol/water solution. The product solids were collected on a Buchner funnel and washed with methanol, water and methanol. The solids were collected in an aluminum pan and were dried of methanol and water in a convection oven at 140° C. for 2 h. The solids were further heated in a vacuum oven to 200° C. for 1 h which melted the solids and stripped off residual DMSO. The product melt was removed from the oven and allowed to cool to ambient temperature. The product, 47.3 g (90.4% yield), had a melt temperature of 185° C. by differential scanning calorimetry measurement on a TA Instruments DSC Q 2000. The product was identified as the desired compound by infrared analysis and NMR and had a purity of >99%.

TABLE 2

| Example or Counter Example | CE1 | EX1 |
|---|---|---|
| Fluoropolymer A | 100 | 100 |
| Carbon Black | 30 | 30 |
| Coagent | 3 | 3 |
| Peroxide | 2 | 2 |
| BF6 Phth | | 2 |
| Physical Properties after Post Cure at 250° C. (482° F.), 16 h | | |
| Tensile, MPa | 21.0 | 19.7 |
| Elongation at break, % | 169 | 175 |
| 50% Modulus, MPa | 4.9 | 6.2 |
| 100% Modulus, MPa | 11.8 | 12.6 |
| Hardness | 81 | 85 |

TABLE 2-continued

| Example or Counter Example | CE1 | EX1 |
|---|---|---|
| Heat Aged at at 300° C. (572° F.), 70 h | | |
| Tensile, MPa | 3.0 | 5.0 |
| Elongation at break, % | 776 | 586 |
| 50% Modulus, MPa | 2.5 | 3.5 |
| 100% Modulus, MPa | 3.1 | 4.8 |
| Hardness | 78 | 82 |
| Compression Set after Post Cure 70 h at 200° C. | 20 | 23 |

TABLE 3

| Example | CE2 | EX2 |
|---|---|---|
| Fluoropolymer C | 100 | 100 |
| Carbon Black | 30 | 30 |
| Coagent | 3 | 3 |
| Peroxide | 2 | 2 |
| BF6 Phth | | 2 |
| Physical Properties after Post Cure at 250° C. (482° F.), 16 h | | |
| Tensile, MPa | 21.7 | 22.0 |
| Elongation at break, % | 220 | 213 |
| 50% Modulus, MPa | 2.4 | 2.4 |
| 100% Modulus, MPa | 6.3 | 6.8 |
| Hardness | 71 | 73 |
| Heat Aged at at 270° C. (518° F.), 70 h | | |
| Tensile, MPa | 10.2 | 11.3 |
| Elongation at break, % | 350 | 276 |
| 50% Modulus, MPa | 1.5 | 1.9 |
| 100% Modulus, MPa | 2.4 | 3.4 |
| Hardness | 69 | 72 |
| Compression Set after Post Cure 70 h at 200° C. | 26 | 26 |

TABLE 4

| Example | EX3 | EX4 | EX5 |
|---|---|---|---|
| Fluoropolymer B | 100 | 100 | 100 |
| Carbon Black | 30 | 30 | 30 |
| Ca(OH)$_2$ | 6 | 6 | 6 |
| MgO | 3 | 3 | 3 |
| CaO | 3 | 3 | 3 |
| BTPPCl | 1 | 1 | 1 |
| BF6 Phth | 2 | | |
| BPT Phth | | 2 | |
| Resorc Phth | | | 2 |
| Cure rheology (160° C.) | | | |
| ML, Minimum Torque, Nm | 0.15 | 0.17 | 0.15 |
| MH, Maximum Torque, Nm | 0.44 | 0.49 | 0.44 |
| Δ torque, Nm | 0.29 | 0.32 | 0.29 |
| t'50, Time to 50% cure - min | 1.3 | 1.2 | 1.4 |
| t'90, Time to 90% cure - min | 5.3 | 4.7 | 5.6 |
| tan δ ML | 0.93 | 0.91 | 0.92 |
| tan δ MH | 0.439 | 0.406 | 0.422 |
| Physical Properties after Press Cure at 160° C. (320° F.), 10 min | | | |
| Tensile, MPa | 2.4 | 3.8 | 3.2 |
| Elongation at break, % | 1317 | 1068 | 1148 |
| 50% Modulus, MPa | 1.4 | 1.7 | 1.6 |
| 100% Modulus, MPa | 1.6 | 2.0 | 1.8 |
| Hardness | 66 | 65 | 62 |
| Physical Properties after Post Cure at 200° C. (450° F.), 1 h, 4 h 250° C. | | | |
| Tensile, MPa | 4.8 | 5.8 | 5.8 |
| Elongation at break, % | 657 | 542 | 518 |
| 50% Modulus, MPa | 1.3 | 1.5 | 1.6 |
| 100% Modulus, MPa | 1.7 | 2.0 | 2.2 |

TABLE 4-continued

| Example | EX3 | EX4 | EX5 |
|---|---|---|---|
| Hardness | 60 | 65 | 65 |
| Compression Set after Post Cure 70 h at 200° C. | 103 | 94 | 94 |

TABLE 5

| Example | CE3 | EX6 |
|---|---|---|
| Fluoropolymer B | 100 | 100 |
| Carbon Black | 30 | 30 |
| Ca(OH)$_2$ | 6 | 6 |
| MgO | 3 | 3 |
| BTPPCl | 1 | 1 |
| BF6 Phth | | 2 |
| BF6 | 1.5 | 1.5 |
| Cure rheology (160° C.) | | |
| ML, Minimum Torque, Nm | 0.16 | 0.15 |
| MH, Maximum Torque, Nm | 1.59 | 1.63 |
| Δ torque, dNm | 1.43 | 1.48 |
| t'50, Time to 50% cure - min | 0.6 | 0.7 |
| t'90, Time to 90% cure - min | 1.3 | 2.4 |
| tan δ ML | 0.89 | 0.87 |
| tan δ MH | 0.111 | 0.094 |
| Physical Properties after Post Cure at 250° C. (482° F.), 16 h | | |
| Tensile, MPa | 13.3 | 12.7 |
| Elongation at break, % | 248 | 235 |
| 50% Modulus, MPa | 2.5 | 2.8 |
| 100% Modulus, MPa | 4.7 | 5.3 |
| Hardness | 74 | 76 |
| Heat Aged at at 270° C. (518° F.), 70 h | | |
| Tensile, PSI | 8.0 | 9.1 |
| Elongation at break, % | 319 | 242 |
| 50% Modulus, MPa | 2.3 | 3.2 |
| 100% Modulus, MPa | 3.4 | 5.2 |
| Hardness | 75 | 80 |
| Compression Set after Post Cure 70 h at 200° C. | 27 | 31 |

Foreseeable modifications and alterations of this invention will be apparent to those skilled in the art without departing from the scope and spirit of this invention. This invention should not be restricted to the embodiments that are set forth in this application for illustrative purposes. To the extent that there is any conflict or discrepancy between this specification as written and the disclosure in any document mentioned or incorporated by reference herein, this specification as written will prevail.

What is claimed is:

1. A curable composition comprising (a) a partially fluorinated polymer, wherein the backbone of the partially fluorinated polymer comprises carbon-carbon double bonds or is capable of forming carbon-carbon double bond, and (b) a compound of Formula I

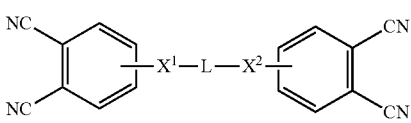

wherein $X^1$ and $X^2$ are independently selected from O or S, and L is

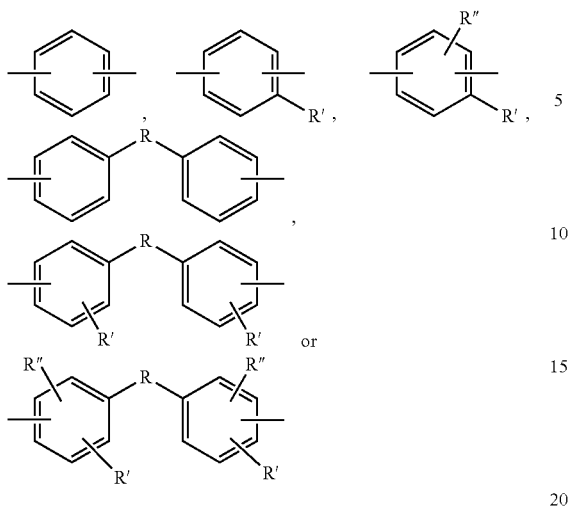

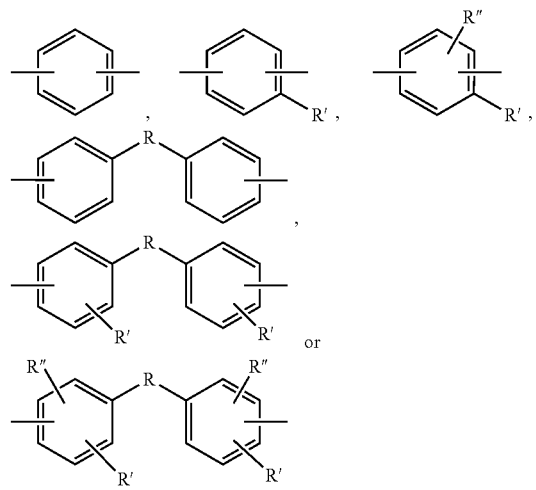

wherein R is selected from the group consisting of —S—, —O—, —C(CF₃)₂—, —C(CH₃)₂—, —CH₂—, —SO₂—, —C(=O)—, or —C(CH₃)₂—C₆H₄—C(CH₃)₂—; each R' is independently selected from a methyl, methoxy, ethyl, and ethoxy group; and each R'' is independently selected from a methyl, methoxy, ethyl, or ethoxy group.

2. The curable composition of claim 1, wherein the curable composition further comprises a polyhydroxy curative.

3. The curable composition of claim 2, wherein the polyhydroxy curative is selected from at least one of 4,4'-hexafluoroisopropylidenyl bisphenol, 4,4'-dihydroxydiphenyl sulfone, 4,4'-isopropylidenyl bisphenol, 4,4' (perfluoropropane-2,2-diyl)diphenol, dihydroxybenzophenone, hydroquinone, 2,4,6-trimercapto-S-triazine, 4,4'-thiodiphenol, or a metal salt thereof.

4. The curable composition of claim 1, wherein the partially fluorinated polymer is derived from (i) vinylidene fluoride, tetrafluoroethylene, and propylene; (iii) vinylidene fluoride with hexafluoropropylene; (iv) hexafluoropropylene, tetrafluoroethylene, and vinylidene fluoride; (v) hexafluoropropylene and vinylidene fluoride, (ix) tetrafluoroethylene, propylene, and 3,3,3-trifluoropropene; (x) tetrafluoroethylene, and propylene; or (xvi) combinations thereof.

5. The curable composition of claim 1, wherein the partially fluorinated polymer comprises (i) at least one of vinylidene fluoride or tetrafluoroethylene, and (ii) a fluorinated comonomer having an acidic hydrogen atom.

6. The curable composition of claim 1, comprising at least 0.1 part by weight of the compound of Formula I to 100 parts by weight of the partially fluorinated polymer.

7. A curable composition comprising (a) a fluorinated elastomeric gum comprising a fluoropolymer, wherein the fluoropolymer comprises at least one of —I, —Br, and —CN cure site, (b) a peroxide curing system comprising a peroxide and a coagent, and (c) a compound of Formula I

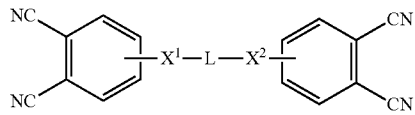

wherein $X^1$ and $X^2$ are independently selected from O or S, and L is wherein R is selected from the group consisting of —S—, —O—, —C(CF₃)₂—, —C(CH₃)₂—, —CH₂—, —SO₂—, —C(=O)—, or —C(CH₃)₂—C₆H₄—C(CH₃)₂—; each R' is independently selected from a methyl, methoxy, ethyl, and ethoxy group; and each R'' is independently selected from a methyl, methoxy, ethyl, or ethoxy group.

8. The curable composition of claim 7, wherein the coagent comprises (i) diallyl ether of glycerin, (ii) triallylphosphoric acid, (iii) diallyl adipate, (iv) diallylmelamine and triallyl isocyanurate, (v) tri(methyl)allyl isocyanurate, (vi) tri(methyl)allyl cyanurate, (vii) poly-triallyl isocyanurate, (viii) xylylene-bis(diallyl isocyanurate), (xi) CH₂=CH—Rf1-CH=CH₂ wherein Rf1 may be a perfluoroalkylene of 1 to 8 carbon atoms, or combinations thereof.

9. The curable composition of claim 7, wherein the peroxide comprises 2,5-dimethyl-2,5-di(t-butylperoxy)hexane; dicumyl peroxide; di(2-t-butylperoxyisopropyl)benzene; dialkyl peroxide; bis (dialkyl peroxide); 2,5-dimethyl-2,5-di(tertiarybutylperoxy)3-hexyne; dibenzoyl peroxide; 2,4-dichlorobenzoyl peroxide; tertiarybutyl perbenzoate; α,α'-bis(t-butylperoxy-diisopropylbenzene); t-butyl peroxy isopropylcarbonate, t-butyl peroxy 2-ethylhexyl carbonate, t-amyl peroxy 2-ethylhexyl carbonate, t-hexylperoxy isopropyl carbonate, di[1,3-dimethyl-3-(t-butylperoxy)butyl] carbonate, carbonoperoxoic acid, O,O'-1,3-propanediyl OO,OO'-bis(1,1-dimethylethyl) ester, or combinations thereof.

10. The curable composition of claim 7, wherein the fluoropolymer comprises (i) a copolymer comprising tetrafluoroethylene, vinylidene fluoride, and hexafluoropropylene monomeric units; (ii) a copolymer comprising tetrafluoroethylene, and propylene monomeric units; (iii) a copolymer comprising tetrafluoroethylene, vinylidene fluoride, and propylene monomeric units; (iv) a copolymer comprising vinylidene fluoride, perfluoro (methyl vinyl) ether, and hexafluoropropylene monomeric units; (v) a copolymer comprising tetrafluoroethylene, vinyl fluoride, and hexafluoropropylene monomeric units; (vi) a copolymer comprising vinyl fluoride, perfluoro (methyl vinyl) ether, and hexafluoropropylene monomeric units; (vii) a copolymer of TFE with perfluorovinyl ether, (viii) a copolymer of TFE with perfluoroallyl ether, or combinations thereof.

11. The curable composition of claim 7, wherein an amount of the compound of Formula I is at least 0.05 parts by weight per 100 parts of the fluoropolymer.

12. The curable composition of claim 1, wherein L is a divalent, trivalent or tetravalent benzene group.

13. The curable composition of claim 1, wherein the partially fluorinated polymer is amorphous.

14. A cured article derived from the curable composition of claim 1.

15. The cured article of claim 14, wherein the cured article is an o-ring, a seal, a gasket, a hose, or a sheet.

16. The curable composition of claim 5, wherein the fluorinated comonomer having an acidic hydrogen atom is selected from: trifluoroethylene; vinyl fluoride; 3,3,3-trifluoropropene-1; pentafluoropropene; or 2,3,3,3-tetrafluoropropene.

* * * * *